(12) United States Patent
Khosrowpour et al.

(10) Patent No.: US 10,853,093 B2
(45) Date of Patent: Dec. 1, 2020

(54) APPLICATION PROFILING VIA LOOPBACK METHODS

(71) Applicant: Dell Products L.P., Round Rock, TX (US)

(72) Inventors: Farzad Khosrowpour, Pflugerville, TX (US); Nikhil Vichare, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 687 days.

(21) Appl. No.: 15/719,789

(22) Filed: Sep. 29, 2017

(65) Prior Publication Data

US 2019/0102204 A1  Apr. 4, 2019

(51) Int. Cl.
*G06F 9/445* (2018.01)
*G06N 5/04* (2006.01)
*G06N 20/00* (2019.01)
*G06F 11/34* (2006.01)
*G06N 5/00* (2006.01)
*G06N 20/20* (2019.01)
*G06N 20/10* (2019.01)

(52) U.S. Cl.
CPC ............ *G06F 9/4451* (2013.01); *G06F 11/34* (2013.01); *G06N 5/003* (2013.01); *G06N 5/04* (2013.01); *G06N 20/00* (2019.01); *G06N 20/20* (2019.01); *G06N 20/10* (2019.01)

(58) Field of Classification Search
USPC ......................................................... 706/12
See application file for complete search history.

(56) References Cited

U.S. PATENT DOCUMENTS

| 7,401,012 | B1 | 7/2008 | Bonebakker et al. |
| 7,685,413 | B2 | 3/2010 | Peterman et al. |
| 7,974,714 | B2 * | 7/2011 | Hoffberg ................ H04N 7/163 |
| | | | 700/94 |

(Continued)

OTHER PUBLICATIONS

Farzad Khosrowpour et al., U.S. Appl. No. 15/583,078, filed May 1, 2017, entitled Methods to Associate Workloads to Optimal System Settings.

(Continued)

*Primary Examiner* — Michael B Holmes
(74) *Attorney, Agent, or Firm* — Terrile, Cannatti & Chambers; Stephen A. Terrile

(57) ABSTRACT

A system, method, and computer-readable medium are disclosed for performing a dynamic application optimization operation, comprising: instrumenting a plurality of system parameters of a client information handling system for monitoring; instructing a user to execute a particular application on the client information handling system; obtaining a plurality of samples of the plurality of system parameters; performing a machine learning operation using the plurality of samples of the plurality of system parameters, the machine learning operation training a machine learning model to generate a profile for the particular application and an operating mode of the particular application; applying the profile to the client information handling system to provide a new information handling system configuration, the new information handling system configuration optimizing the information handling system for the particular application.

20 Claims, 4 Drawing Sheets

(56) References Cited

U.S. PATENT DOCUMENTS

| | | | |
|---|---|---|---|
| 8,010,679 B2* | 8/2011 | Low | H04L 63/0227 709/227 |
| 8,051,180 B2* | 11/2011 | Mazzaferri | G06F 3/1438 709/227 |
| 8,090,797 B2* | 1/2012 | Chinta | G06F 21/53 709/217 |
| 8,117,314 B2* | 2/2012 | Croft | G06F 3/1415 709/227 |
| 8,276,112 B2 | 9/2012 | Fritzsche et al. | |
| 8,321,362 B2 | 11/2012 | Carrizo et al. | |
| 8,326,943 B2* | 12/2012 | Chinta | G06F 21/53 709/217 |
| 8,341,270 B2* | 12/2012 | Mazzaferri | H04L 67/16 709/227 |
| 8,341,732 B2* | 12/2012 | Croft | H04L 63/0227 726/21 |
| 8,355,407 B2* | 1/2013 | Wookey | H04L 63/102 370/401 |
| 8,387,059 B2 | 2/2013 | Chang et al. | |
| 9,043,788 B2 | 5/2015 | Garrett et al. | |
| 9,336,302 B1 | 5/2016 | Swamy | |
| 9,477,287 B1 | 10/2016 | Schow et al. | |
| 9,588,820 B2 | 3/2017 | Ravi et al. | |
| 9,996,389 B2 | 6/2018 | Caufield et al. | |
| 10,061,233 B2 | 8/2018 | Damgar et al. | |
| 2002/0188580 A1 | 12/2002 | Doddi et al. | |
| 2005/0262230 A1 | 11/2005 | Liu et al. | |
| 2007/0028217 A1 | 2/2007 | Mishra et al. | |
| 2007/0282567 A1 | 12/2007 | Dawson et al. | |
| 2008/0098254 A1 | 4/2008 | Altevogt et al. | |
| 2009/0112780 A1 | 4/2009 | Chen et al. | |
| 2010/0063948 A1 | 3/2010 | Virkar et al. | |
| 2011/0010361 A1 | 1/2011 | Burger et al. | |
| 2011/0060827 A1 | 3/2011 | Corley et al. | |
| 2012/0310618 A1 | 12/2012 | B'Far et al. | |
| 2013/0041989 A1 | 2/2013 | Boss et al. | |
| 2013/0254196 A1 | 9/2013 | Babu et al. | |
| 2014/0122387 A1 | 5/2014 | Chi et al. | |
| 2015/0160098 A1 | 6/2015 | Noda et al. | |
| 2015/0227452 A1 | 8/2015 | Raghavan et al. | |
| 2016/0140028 A1 | 5/2016 | Woodward | |
| 2016/0357840 A1 | 12/2016 | Odashima et al. | |
| 2016/0378847 A1 | 12/2016 | Byrnes et al. | |
| 2017/0153962 A1 | 6/2017 | Biegun et al. | |
| 2018/0024859 A1 | 1/2018 | Doshi et al. | |
| 2018/0102953 A1 | 4/2018 | Mahindru et al. | |

OTHER PUBLICATIONS

Farzad Khosrowpour et al., U.S. Appl. No. 15/499,050, filed Apr. 27, 2017, entitled System Performance Measurement of Stochastic Workloads.

Lenovo, Performance Tuner Software, printed Aug. 21, 2017, https://www.thinkworkstationsoftware.com/download.html.

Kleinosowski et al., MinneSPEC: A New SPEC Benchmark Workload for Simulation-Based Computer Architecture Research, University of Minnesota ARCTiC Labs technical report No. 02-08, Oct. 2002, 4 pages.

John, Lizy Kurian, More on finding a single number to indicate overall performance of a benchmark suite, AMC SIGARCH Computer Architecture News, vol. 32, Issue 1, Mar. 2004, pp. 3-8.

Jain, Raj, The Art of Computer Systems Performance Analysis: Techniques for Experimental Design, Measurement, Simulation, and Modeling, 1991, 714 pages.

* cited by examiner

APPLICATION PROFILING VIA LOOPBACK METHODS

BACKGROUND OF THE INVENTION

Field of the Invention

The present invention relates to information handling systems. More specifically, embodiments of the invention relate to information handling system performance optimization using application profiling.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

With certain information handling systems, different applications can leverage system resources including hardware resources differently.

SUMMARY OF THE INVENTION

A system, method, and computer-readable medium are disclosed for performing a dynamic application optimization operation. The dynamic application optimization operation allows optimization of a client device for an application based on the application characteristics on a particular device to provide improved performance of the application to users of the client device.

In certain embodiments, a system, method, and computer-readable medium are disclosed for performing a dynamic application optimization operation, comprising: instrumenting a plurality of system parameters of a client information handling system for monitoring; instructing a user to execute a particular application on the client information handling system; obtaining a plurality of samples of the plurality of system parameters; performing a machine learning operation using the plurality of samples of the plurality of system parameters, the machine learning operation training a machine learning model to generate a profile for the particular application and an operating mode of the particular application; applying the profile to the client information handling system to provide a new information handling system configuration, the new information handling system configuration optimizing the information handling system for the particular application, the dynamic application optimization operation optimizing the client information handling system for the particular application based on application characteristics on the client information handling system to provide increased performance of the particular application to the user of the client information handling system.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
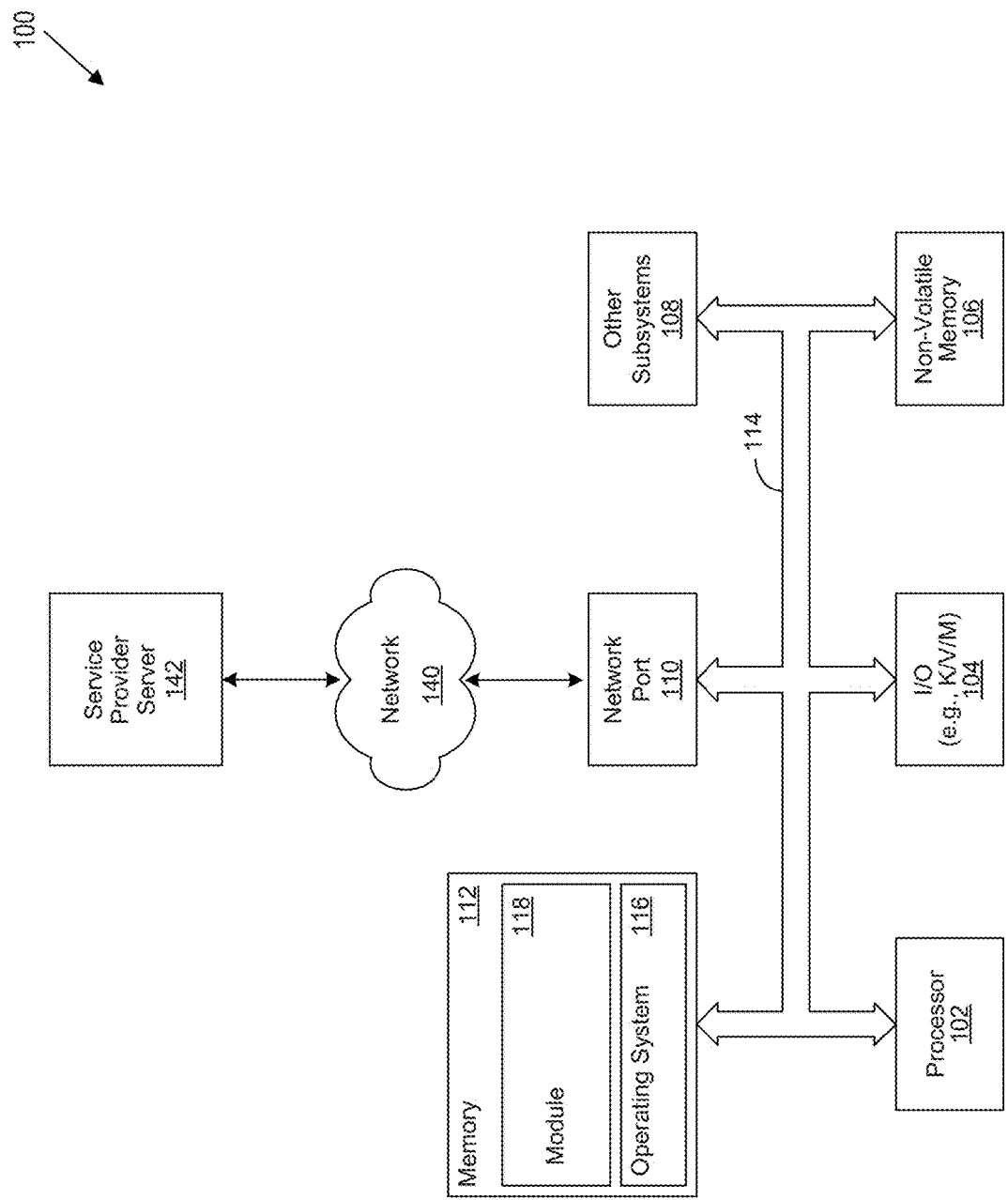
FIG. 1 shows a general illustration of components of an information handling system as implemented in the system and method of the present invention.

Various aspects of the present disclosure include an appreciation that with known optimization systems, configuration parameters for an application are predefined based on profiles that are developed pre-production and are loaded before the information handling system is deployed. With known optimization systems, the optimization system monitors the application initiation on a particular platform and operating system. When the application initiates execution, the optimization system accesses a profile for the application and loads profile parameters so that any configuration changes are applied to the information handling system.

Various aspects of the present disclosure include an appreciation that dynamic optimization as performed herein is different from the general field of Application Performance Monitoring (APM). While APM can have the same goal of optimizing application performance, APM follows a fundamentally different approach when attempting to solve this problem. For example, with APM, the methodology used is a synthetics methodology, whereas with dynamic optimization the methodology used is a combination of analytics and machine learning. With APM, the causality is based on a capture methodology, whereas with dynamic optimization the causality is based on a combination of capture and prediction. With APM, the collector used is an in application agent, whereas with dynamic optimization the collector used is hardware instrumentation. With APM, the data collected is real time measurement data, whereas with dynamic optimization the data collected is real time measurement data executed against a trained model. With APM, the device is tested using dependency mapping, whereas with dynamic optimization the device is tested using baselining. With APM, the typical user is highly skilled to optimizing the system (such as an IT administrator), whereas with dynamic optimization the typical user can be a relative novice to optimizing the system.

Various aspects of the present disclosure include an appreciation that optimization of performance for applications is often dependent on a plurality of parameters, some of which may be complex, as well as the interaction of these parameters. Runtime characterization of applications and/or workloads and appropriate binding of this information to the platform may include parameters such hyperthread management, core configuration management, non-uniform memory access (NUMA) configuration, and many others. Some expert users can set proper attributes of the system to achieve an optimal performance for their application. However, novice, and even intermediate, users often avoid changing default configurations since they are unaware of the critical parameters and their true effects. Furthermore, many applications have different operating modes and various users may run these applications differently, resulting in added complexity in configuration of the system.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise dynamic application optimization system 118.

The dynamic application optimization system 118 performs a dynamic application optimization operation. The dynamic application optimization operation allows optimization of a client device (e.g., a client information handling system) for an application based on the application characteristics on a particular information handling system device to provide the improved performance of the application to the user of the client device. In certain applications, the improved performance can be over 150% application performance when compared to the application executing in a non-optimized configuration.

When performing the dynamic application optimization operation, a list of important system parameters is instrumented for monitoring. As used herein, instrumenting may be defined as configuring internal sensors and log collection within an information handling system to allow monitoring and storing information relating to a plurality of parameters of the information handling system. A user is instructed to execute the application for a short period of time (e.g., for less than five minutes). The instrumentation provides sufficient samples to analyze how the application behaves to the user preferences. The data is used against a trained machine learning model to generate a profile for the application and its operating mode. The profile is then applied to the information handling system to optimize the information handling system for the application while taking into account the user preferences. The dynamic application optimization operation then notifies the user to execute the application with the new system configuration where the new system configuration achieves the best performance for the application in the particular mode of operation of the application. For example, the particular mode of operation of the application can include selecting a single threaded mode of operation or a multi-threaded mode of operation for the application. Adjusting a Hyper-threading (FIT) setting of the system configuration would result in a performance benefit from HT being set off when the single threaded mode of operation is in effect. However, if the multi-threaded mode of operation is in effect, then HT being set on would result in a performance benefit to the application. Also, for example, certain applications may include a travel mode of operation (e.g., the system is not connected to a power supply). Adjusting a power profile configuration, such as a balanced power profile and a high performance power profile, of the system configuration would result in a performance benefit however, battery life and thermals may be affected by applying the high performance power profile.

In certain embodiments, such a dynamic application optimization operation builds a profile by application which is agnostic of application name. In certain embodiments, such a dynamic application optimization operation provides an information handling system with optimal settings which are specific to a combination of application workload for a particular user in combination with the information handling system used by the particular user. Other systems my provide recommendation either using the application name or general guidelines on how to run an independent software vendor application on specific hardware.

The dynamic application optimization operation improves the efficiency of processor efficiency (and thus the efficiency of the information handling system 100) by adjusting a plurality of parameters associated with the information handling system, some of which may be complex, as well as the interaction of these parameters based upon the application executing on the information handling system.

As will be appreciated, once the information handling system 100 is configured to perform the dynamic application optimization operation, the information handling system 100 becomes a specialized computing device specifically configured to perform the dynamic application optimization operation and is not a general purpose computing device. Moreover, the implementation of the dynamic application optimization operation on the information handling system 100 improves the functionality of the information handling system and provides a useful and concrete result of improving the performance of the information handling system when executing an application by adjusting certain parameters, including hardware type parameters, of the information handling system.

Figure 2:
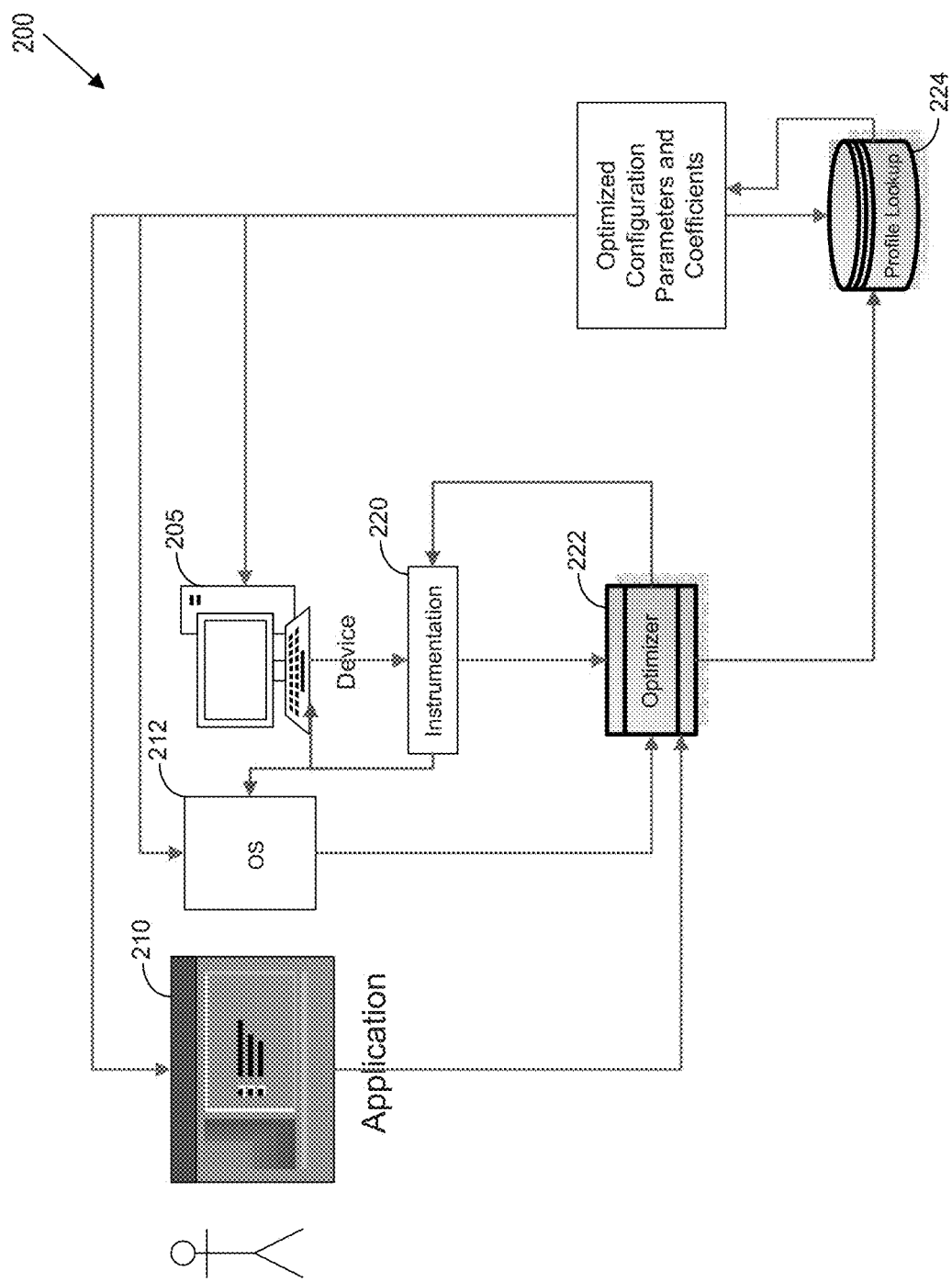
FIG. 2 shows a block diagram of a dynamic application optimization environment.

FIG. 2 shows a block diagram of a dynamic application optimization environment 200. More specifically, the dynamic application optimization environment 200 includes an information handling system 205 (such as information handing system 100) as well as an application 210 and an operating system 212. The application 210 and operating system 212 may be stored in the memory 112 and executed by the processor 102 of the information handling system. The dynamic application optimization environment 200 further includes an instrumentation portion 220, an optimizer module 222 and a profile repository 224. In various embodiments, some or all of the instrumentation portion 220, the optimizer module 222 and the profile repository 224 may reside on the information handling system 205 or may execute remotely and be accessed by the information handling system 205 via a network 140. The instrumentation portion 220 obtains and saves one or more system parameters. In various embodiments, the system parameters can include one or more of a CPU utilization parameter, a number of threads parameter, a utilization by thread parameter, a processor queue length parameter, a cpu frequency parameter, a turbo residency parameter, a memory utilization parameter, a paging activity parameter, a disk read/writes parameter, a graphics processor unit (gpu) utilization parameter, a gpu memory consumption parameter. More specifically, in various embodiments, the system parameters can include percent of processor time parameter, a percent of user time parameter, a percent of privileged time parameter, a virtual bytes peak parameter, a virtual byes parameter, a page faults per second parameter, a working set peak parameter, a working set parameter, a page file bytes peak parameter, a page file bytes parameter, a private bytes parameter, a thread count parameter, a priority based parameter, an elapsed time parameter, a ID process parameter, a creating process ID parameter, a pool paged bytes parameter, a pool non-paged bytes parameter, a handle count parameter, an I/O read operations per second parameter, an I/O write operations per second parameter, an I/O data operations per second parameter, an I/O other operations per second parameter, an I/O read bytes per second parameter, an I/O write bytes per second parameter, an I/O data bytes per second parameter, an I/O other bytes per second parameter and a working set—private parameter.

When accessed by the optimizer module 222, the profile repository 220 provides optimized configuration parameters and coefficients which are used to optimize operation of the information handling system 205 and operating system 212 for a particular application 210 as well as how that application is used by a particular user.

More specifically, in operation the optimizer module 222 monitors the application 210 when the applications starts executing on a particular information handling system 201 executing a particular operating system 212. For example, the application might execute differently when executing within a Windows type operating system as compared to a Linux type operating system. A user then executes the application (and interacts with the application) for some period of time. In certain embodiments, the period of time is substantially twenty minutes (+/−20%). In certain embodiments, the dynamic application optimization operation obtains information across five instances of the execution of the application for the period of time. The dynamic application optimization operation then applies a machine learning model for each instance and obtains the results for each instance. The dynamic application operation then analyzes the results to identify preferred results. In certain embodiments, the preferred result is based upon a majority of results from the five instances. While the user executes and interacts with the application, the instrumentation portion 220 monitors the application as well as a plurality of performance data points (i.e., the data points of the system parameters obtained by the instrumentation portion 220) and collects the data from the plurality of performance data points. This interaction and monitoring may be considered a training mode of operation.

Next, the optimizer module 222 performs a machine learning decision making operation to determine a configuration of the information handling system 205 which best optimizes the information handling system 205 for the particular user executing the particular application 210. In certain embodiments, the machine learning decision making operation includes executing the data against a machine learning model to determine the best configuration for that platform based on collected performance information.

Next, the optimizer module 222 accesses the profile repository 224 to determine optimization information to apply to the information handling system. The optimization information can include optimized parameters and coefficients.

Next, the optimizer module 222 makes a decision regarding whether to continue using present parameter configuration or to adjust one or more parameters to provide a more optimal configuration which would result in a more optimal performance of the information handling system when executing the particular application for the particular user. If the optimizer module determines that changes to the one or more parameters are desirable, then the optimizer module 222 applies the changes to the parameters. After applying the changes, the optimizer module 222 continues to monitor the performance of the application via the instrumentation portion 220 to obtain new samples and to iteratively determine whether additional parameter changes are desirable.

Figure 3:
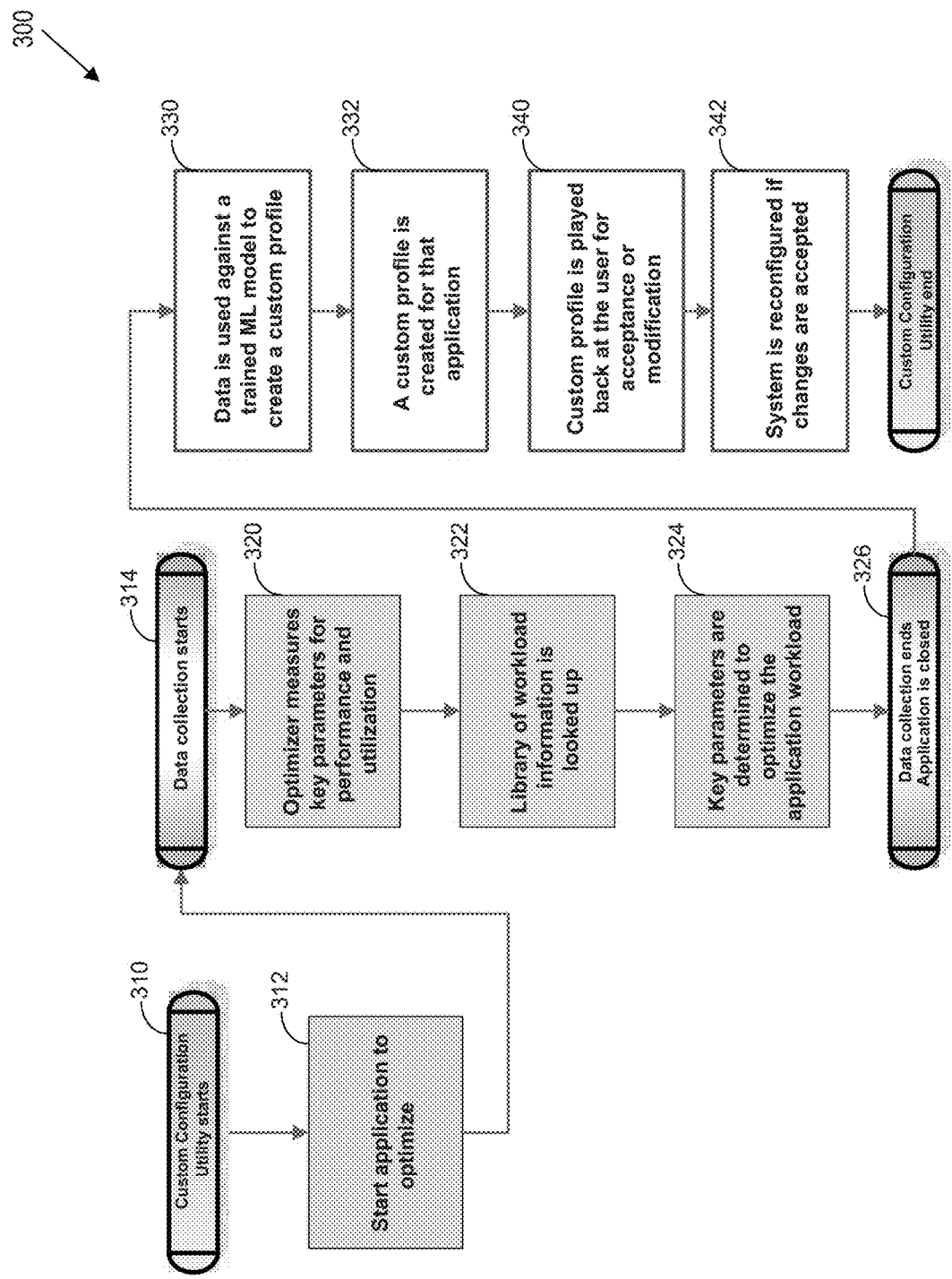
FIG. 3 shows a flow chart of the operation of a dynamic application optimization operation.

FIG. 3 shows a flow chart of the operation of a dynamic application optimization operation 300. More specifically, the dynamic application optimization operation starts at step 310 by executing the dynamic application optimization module 118. In certain embodiments, the dynamic application optimization module 118 is contained within a customer configuration utility which is contained within a performance optimization system such as the Dell Performance Optimization system available from Dell Technologies, Inc. Next, at step 312, a particular user starts the particular application to be optimized. The dynamic application optimization module 118 then begins collecting data relating to the application at step 314. In certain embodiments, the data includes information resulting from user interactions with the particular application.

Next, at step 320, the optimizer module 222 measures key parameters for performance and utilization. In certain embodiments, the key parameters include a normalized utilization of the top three dominant threads of the application being learned, median threads of the application, overall CPU utilization during learning period, number of active cores on the system, time spent in an idle state of an advanced configuration and power interface (ACPI) mode of operation (i.e., C-states). Next, at step 322, the dynamic application optimization module 118 accesses the profile repository 224 to obtain a library of workload information. Next, at step 324, the dynamic application optimization module 118 determines key parameters to optimize the application workload, in part by using the information obtained from the library of workload information. Next, at step 326, the trial execution of the application closes and data collection ends.

Next, at step 330, the data is used against a trained machine learning model to create a custom profile. In certain embodiments, the trained machine learning model comprises at least one of a logistic regression machine learning model and a random forest machine learning model. In certain embodiments, the machine learning model comprises a logistic regression model in R which is regularized using an ElasticNet penalty via an application such as the glmnet package in an R source package. In certain embodiments, the logistic regression model comprises an operation for fitting a regression curve which facilitates predicting a categorical variable for a set of predictors. In certain embodiments, the ElasticNet penalty linearly combines rectilinear distance (e.g., L1 and L2) penalties of a least absolute shrinkage and selection operator (lasso regression analysis method and ridge (also referred to as Tikhonov regularization) regression analysis method of regularized regression. Next, at step 332, the dynamic application optimization module 118 creates a customer profile for the particular application.

In certain embodiments, the custom profile is provided to the user for acceptance or modification at step 340. If the custom profile is provided and accepted by the user then the information handling system is reconfigured at step 342 and the dynamic application optimization operation completes. In certain embodiments (such as when the custom profile is not provided to the user), the information handling system is automatically reconfigured at step 342 and the dynamic application optimization operation completes.

Figures 4, 5:
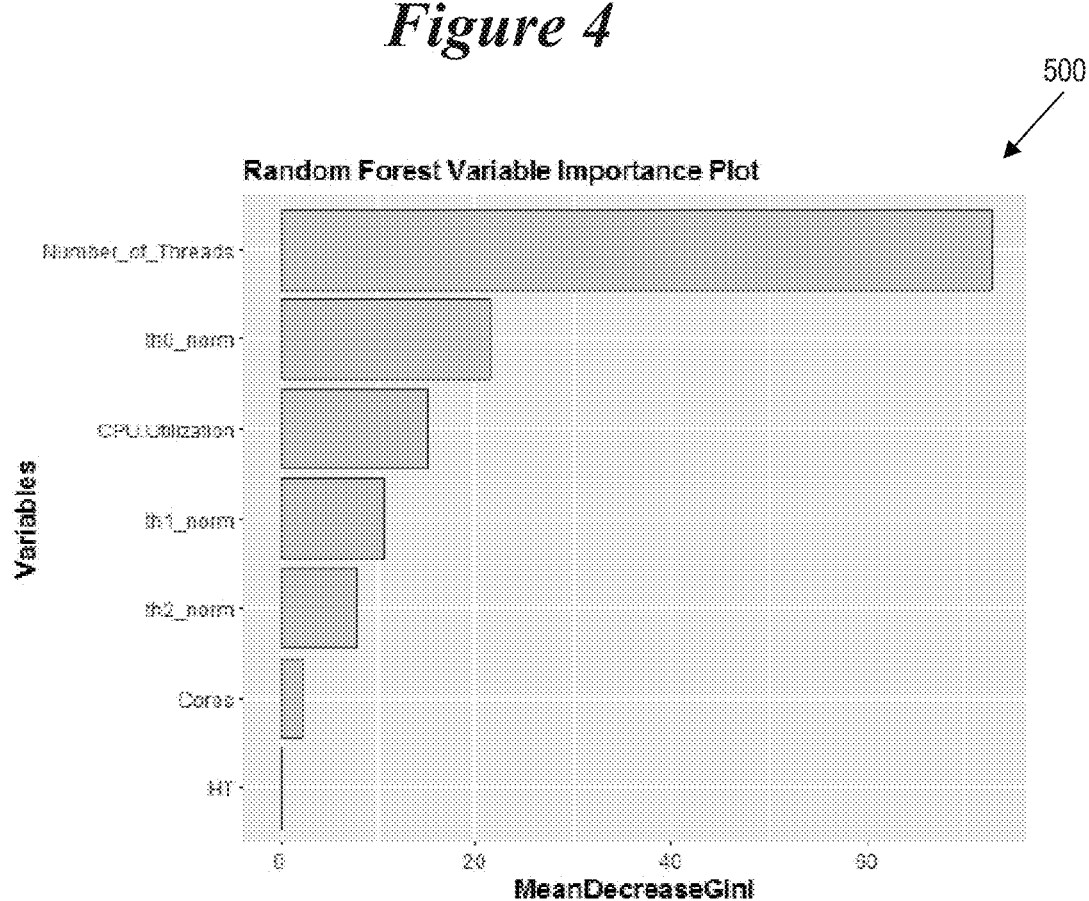
FIG. 4 shows a machine learning model table.
FIG. 5 shows an example result from a random forest variable importance plot.

FIG. 4 shows a machine learning model table. FIG. 5 shows an example result from a random forest variable importance plot. In one empirical example, the dynamic application optimization module performed a dynamic application optimization operation to identify optimal Hyper-threading settings for a given application based on the resource utilization of that application. When performing the dynamic application optimization operation, the machine learning is agnostic of the application names. (i.e., the application name and type is obscured when performing the dynamic application optimization operation.

When performing the dynamic application optimization operation, the profile repository 224 included a data set from lab tests using hyper threading on/off sending across a plurality of applications, a plurality of hardware configurations and a plurality of settings. The operation took into account a large number of parameters (e.g., more than 100 parameters) including the system parameters discussed herein of resource utilization. In certain embodiments, the resource utilization is monitored using industry standard resource utilization tools.

In certain embodiments, the machine learning model performs a classification of the parameters. In certain embodiments, the classification of parameters includes a binary classification of parameters. In certain embodiments, the machine learning model identifies response variables and predictor variables. For example, when performing the dynamic application optimization operation, the machine learning model identifies whether to turn hyper threading on or off as a response variable. When performing the dynamic application optimization operation, the machine learning operation identifies CPU utilization, thread execution information, core execution information, existing hyper threading setting, utilization per thread, etc. as predictor variables.

In certain embodiments, the machine learning model performs one or more of a classification tree (ctree) operation, a logistic regression operation, a random forest operation, an adaptive boosting (adaboost) operation and a support vector machine (SVM) operation. Such a machine learning model provides five-fold cross validation accuracy (e.g., an accuracy of >94% on initial datasets suing various machine learning models). In certain embodiments, the dynamic performance optimization operation preferentially uses a logistics regression with ElasticNet Regularization machine learning model as such a model may be implemented within a performance optimizer such as the Dell Performance Optimizer available from Dell Technologies, Inc. In certain embodiments, the disclosed results will likely changes after learning instances taking into account idle or low use application conditions.

Referring again to FIG. 5, a correlation matrix 500 is generated to identify highly correlated features when performing a dynamic application optimization operation. Certain features, such as average threads, maximum threads and elapsed time were removed due to high correlation with median threads. Median threads were preferred over average threads due to non-normal distribution of threads data. The data used to generate the correlation matrix is agnostic of application name and thus the application name is not included within the correlation matrix. The correlation matrix 500 shows a mean increase in performance of a plurality of variables for a random forest variable operation. More specifically, a number of threads variable (Number_of_Threads) represents a total number of threads spun by the application being learned, the thread 0 normal (th0_norm), thread 1 normal (th1_norm), and thread 2 normal (th2_norm) variables represent an average respective processor utilization of the top three dominant threads of the process being monitored, the processor utilization variable (CPU.Utilization) represents an overall processor utilization of the information handling system, the cores variable (Cores) represents a number of active local cores and the hyper-threading variable (HT) represents an existing hyper-threading setting on the system.

As will be appreciated by one skilled in the art, the present invention may be embodied as a method, system, or computer program product. Accordingly, embodiments of the invention may be implemented entirely in hardware, entirely in software (including firmware, resident software, micro-code, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer-readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for performing a dynamic application optimization operation, comprising:
   instrumenting a plurality of system parameters of a client information handling system for monitoring;
   instructing a user to execute a particular application on the client information handling system;
   obtaining a plurality of samples of the plurality of system parameters;
   performing a machine learning operation using the plurality of samples of the plurality of system parameters, the machine learning operation training a machine learning model to generate a profile for the particular application and an operating mode of the particular application;
   applying the profile to the client information handling system to provide a new information handling system configuration, the new information handling system configuration optimizing the information handling system for the particular application, the dynamic application optimization operation optimizing the client information handling system for the particular application based on application characteristics on the client information handling system to provide increased performance of the particular application to the user of the client information handling system.

2. The method of claim 1, wherein:
the instrumentation provides sufficient samples to analyze how the application behaves to the user preferences.

3. The method of claim 1, wherein:
the machine learning model takes into account user preferences when executing the particular application.

4. The method of claim 1, further comprising:
instructing the user to execute the particular application with the new system configuration to confirm the new system configuration achieves improved performance for the particular application in a particular mode of operation of the application.

5. The method of claim 1, wherein:
the machine learning model performs at least one of a classification tree (ctree) operation, a logistic regression operation, a random forest operation, an adaptive boosting (adaboost) operation and a support vector machine (SVM) operation.

6. The method of claim 1, wherein:
the plurality of system parameters comprise a CPU utilization parameter, a number of threads parameter, a utilization by thread parameter, a processor queue length parameter, a cpu frequency parameter, a turbo residency parameter, a memory utilization parameter, a paging activity parameter, a disk read/writes parameter, a graphics processor unit (gpu) utilization parameter, a gpu memory consumption parameter.

7. A system comprising:
a processor;
a data bus coupled to the processor; and
a non-transitory, computer-readable storage medium embodying computer program code, the non-transitory, computer-readable storage medium being coupled to the data bus, the computer program code interacting with a plurality of computer operations and comprising instructions executable by the processor and configured for:
   instrumenting a plurality of system parameters of a client information handling system for monitoring;
   instructing a user to execute a particular application on the client information handling system;
   obtaining a plurality of samples of the plurality of system parameters;
   performing a machine learning operation using the plurality of samples of the plurality of system parameters, the machine learning operation training a machine learning model to generate a profile for the particular application and an operating mode of the particular application;

applying the profile to the client information handling system to provide a new information handling system configuration, the new information handling system configuration optimizing the information handling system for the particular application, the dynamic application optimization operation optimizing the client information handling system for the particular application based on application characteristics on the client information handling system to provide increased performance of the particular application to the user of the client information handling system.

8. The system of claim 7, wherein:
the instrumentation provides sufficient samples to analyze how the application behaves to the user preferences.

9. The system of claim 7, wherein:
the machine learning model takes into account user preferences when executing the particular application.

10. The system of claim 7, wherein the instructions executable by the processor are further configured for:
instructing the user to execute the particular application with the new system configuration to confirm the new system configuration achieves improved performance for the particular application in a particular mode of operation of the application.

11. The system of claim 7, wherein:
the machine learning model performs at least one of a classification tree (ctree) operation, a logistic regression operation, a random forest operation, an adaptive boosting (adaboost) operation and a support vector machine (SVM) operation.

12. The system of claim 7, wherein:
the plurality of system parameters comprise a CPU utilization parameter, a number of threads parameter, a utilization by thread parameter, a processor queue length parameter, a cpu frequency parameter, a turbo residency parameter, a memory utilization parameter, a paging activity parameter, a disk read/writes parameter, a graphics processor unit (gpu) utilization parameter, a gpu memory consumption parameter.

13. A non-transitory, computer-readable storage medium embodying computer program code, the computer program code comprising computer executable instructions configured for:
instrumenting a plurality of system parameters of a client information handling system for monitoring;
instructing a user to execute a particular application on the client information handling system;
obtaining a plurality of samples of the plurality of system parameters;
performing a machine learning operation using the plurality of samples of the plurality of system parameters, the machine learning operation training a machine learning model to generate a profile for the particular application and an operating mode of the particular application;

applying the profile to the client information handling system to provide a new information handling system configuration, the new information handling system configuration optimizing the information handling system for the particular application, the dynamic application optimization operation optimizing the client information handling system for the particular application based on application characteristics on the client information handling system to provide increased performance of the particular application to the user of the client information handling system.

14. The non-transitory, computer-readable storage medium of claim 13, wherein:
the instrumentation provides sufficient samples to analyze how the application behaves to the user preferences.

15. The non-transitory, computer-readable storage medium of claim 13, wherein:
the machine learning model takes into account user preferences when executing the particular application.

16. The non-transitory, computer-readable storage medium of claim 13, wherein the computer executable instructions are further configured for:
instructing the user to execute the particular application with the new system configuration to confirm the new system configuration achieves improved performance for the particular application in a particular mode of operation of the application.

17. The non-transitory, computer-readable storage medium of claim 13, wherein:
the machine learning model performs at least one of a classification tree (ctree) operation, a logistic regression operation, a random forest operation, an adaptive boosting (adaboost) operation and a support vector machine (SVM) operation.

18. The non-transitory, computer-readable storage medium of claim 13, wherein:
the plurality of system parameters comprise a CPU utilization parameter, a number of threads parameter, a utilization by thread parameter, a processor queue length parameter, a cpu frequency parameter, a turbo residency parameter, a memory utilization parameter, a paging activity parameter, a disk read/writes parameter, a graphics processor unit (gpu) utilization parameter, a gpu memory consumption parameter.

19. The non-transitory, computer-readable storage medium of claim 13, wherein:
the computer executable instructions are deployable to a client system from a server system at a remote location.

20. The non-transitory, computer-readable storage medium of claim 13, wherein:
the computer executable instructions are provided by a service provider to a user on an on-demand basis.

* * * * *